Feb. 6, 1951 C. E. HASTINGS 2,540,822
THERMAL AIR-SPEED INDICATOR
Filed April 6, 1945 4 Sheets—Sheet 1

Inventor
CHARLES E. HASTINGS
By Ralph L Chappel
Attorney

Feb. 6, 1951        C. E. HASTINGS        2,540,822

THERMAL AIR-SPEED INDICATOR

Filed April 6, 1945        4 Sheets-Sheet 2

Inventor
Charles E. Hastings

By F. J. Schmitt
Attorney

Feb. 6, 1951 C. E. HASTINGS 2,540,822
THERMAL AIR-SPEED INDICATOR
Filed April 6, 1945 4 Sheets-Sheet 4

Inventor
CHARLES E. HASTINGS
By Ralph L. Chappell
Attorney

Patented Feb. 6, 1951

2,540,822

UNITED STATES PATENT OFFICE 2,540,822

THERMAL AIR-SPEED INDICATOR

Charles E. Hastings, Hampton, Va.

Application April 6, 1945, Serial No. 587,000

15 Claims. (Cl. 73—204)

(Granted under the act of March 3, 1883, as amended April 30, 1928; 370 O. G. 757)

This invention relates generally to air speed indicators and recorders, and more particularly to the thermal responsive type.

The measurement of low airspeeds, such as are required in a helicopter, are difficult to determine by the usual pressure indicators because of the very small pressures involved.

The measurement of high airspeeds, such as are required in an airplane, are difficult to determine by the usual pressure indicator because of the necessary application of temperature and pressure corrections.

The measurement of airspeeds by the hot-wire and thermal-flowmeter type anemometers are also attended with disadvantages. The subject invention appears to be much more reliable and suitable for anemometer purposes than said hot-wire and thermal-flowmeter type, as is hereinafter indicated.

The subject device has the following advantages over the hot-wire type of anemometer: the indicating or recording instrument gives a direct measurement of a D. C. voltage instead of a measurement of change in resistance; errors due to changes in air temperature will be greatly reduced; radiation effects tend to cancel; and a greater stability of calibration is obtained.

The subject device has the following advantages over the thermal-flowmeter type of anemometer: the lead distance between the hot and cold junctions is materially reduced thereby improving sensitivity of the measuring circuit; it is aerodynamically cleaner; it is lighter and smaller; it is simpler in design and installation; and much less power is required for heating since the whole mass of air is not heated.

The present invention overcomes all of said difficulties and disadvantages, and results in an anemometer highly adaptable for air speed measurements from low speed to high speed, and in any air temperature and air density. This anemometer operates by placing a thermopile consisting of a straight wire made up of alternate sections of thermocouple wire in an airstream. The thermopile is heated by a source of alternating current passing through the wire. An indicator or recorder is responsive to the thermal difference voltages generated by the thermopile. An air flow tends to bring the wire, consisting of a succession of thermojunctions, to the same temperature throughout, thus reducing the voltage output of the thermopile. This voltage indication is a measure of airspeed. Alternate junctions, cold junctions, are made of large cross-sectional area resulting in low electrical resistance, thereby these junctions with their large cross-sectional areas will not be appreciably heated by the alternating current passing therethrough. The remaining inter-related junctions, the hot junctions, are made of smaller cross-sectional area resulting in a higher electrical resistance, thereby these junctions with their smaller cross-sectional areas will be materially heated by the alternating current passing therethrough. By this means hot and cold thermojunctions are produced which generate an E. M. F. Said E. M. F. becomes a function of the airspeed as the cooling effect of the air stream tends to equalize the thermojunction temperatures. This arrangement is very satisfactory for the measurement of low airspeeds.

For high airspeeds, a true airspeed anemometer can be provided by turning off the heating supply. The indications would then be due to adiabatic thermal differences produced at every other junction. When a body is placed in a high velocity air stream, the air which comes to rest in front of the body, the stagnation region, is compressed and its temperature is raised, depending only on the true velocity of the air. This temperature rise is 25° C. at 500 miles per hour, and is independent of the air temperature or air density. It can be arranged so that the hot junctions have a higher adiabatic rise than the cold junctions. This can be accomplished by painting a heat insulating material alternately on the front and back of the junctions. At low velocities these adiabatic temperature rise effects are negligible; however, at high velocities the temperature effects are material and useful for indicating purposes.

Thus this instrument makes use of two phenomena, each in the range where the effects are practical. The electrically heated thermopile arrangement is used for low velocities since the sensitivity varies approximately inversely as the velocity, giving high sensitivity at low speeds. When the heating supply is turned off the device can be used for high airspeed determinations. The difference in the adiabatic temperature rise at the junctions generates an E. M. F. which is indicated and recorded. This effect varies directly as the square of the velocity, giving high sensitivity at the high speeds. In the high-speed range, true airspeed is obtained which is convenient for navigational purposes since no temperature or pressure corrections need be applied.

The principal object of this invention is to provide means for measuring low velocity air speeds, such as are attained in the operation of helicopters, by the utilization of thermal difference E. M. F.'s generated by a preheated thermopile having variously shaped junctions subjected to the cooling effect of an air stream.

Another object of this invention is to provide means for measuring high velocity air speeds, such as are attained in the operation of airplanes, by the utilization of the difference in the adiabatic temperature rise at variously shaped junctions of a thermopile subjected to an air stream.

Although the immediate object is to provide an instrument for the measurement of airspeeds, I wish it to be clearly understood that my invention is not limited to use in this fluid but may also be used in the measurement of velocities or rates of flow of many fluids. Other uses of this device such as the measurement of electrical energy when the cooling conditions of the thermopile are held constant are obvious to those skilled in the art. It is also possible to use this device to determine the rate of change of temperature by using the greater lag of very large cold junctions to cause a difference in temperature to result between the hot and cold junctions for a given rate of change of temperature.

The invention will now be described in detail with reference to the accompanying drawings, in which.

Figures 2, 3:
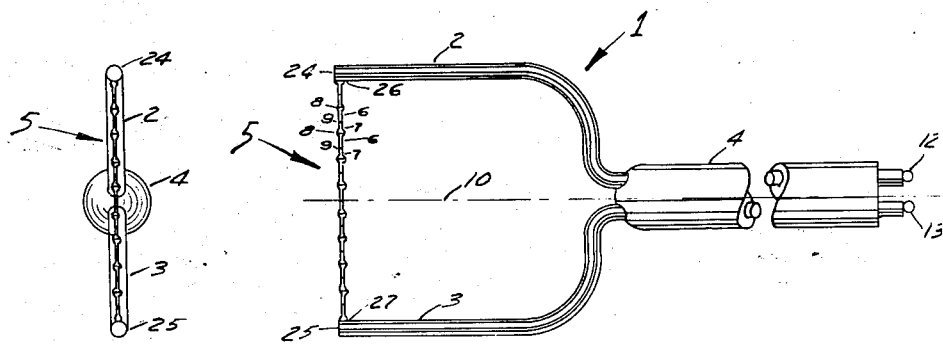
Fig. 2 is a plan view of the pick-up device per se, showing the thermopile bar.
Fig. 3 is a front view of Fig. 2.
Figure 5:
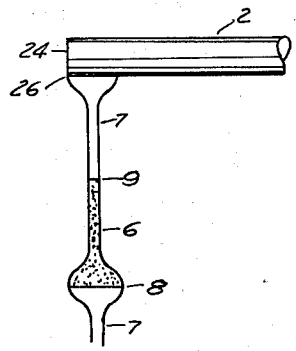
Fig. 5 is an enlarged view showing the connection of the thermopile bar to the pick-up structure.

Numeral 1, Fig. 2, represents a pick-up structure generally likened to a two-pronged fork, across the fork ends of which is secured a bar-like thermopile. The converged ends of fork prongs 2 and 3 are moulded in cylindrical element 4, thereby securing said conductor prong members in a fork-like assembly. Thermopile 5 consists of alternate sections 6 and 7 of two dissimilar metals butt welded as at 8 and 9 to each other. The fabricated thermopile bar element is itself welded across the fork ends 24 and 25 at points 26 and 27, respectively, as shown in Fig. 5. Any number of sections can be used depending upon the thermo-electric potential desired, since the accumulated E. M. F. is proportional to the number of sections used. When one junction of the joined metals in an electrical circuit is heated, an E. M. F. is generated in said circuit. This bar-like arrangement of a plurality of junctions produces a series of E. M. F.'s the summation of which gives a total E. M. F. The two dissimilar metals shown are constantan 7 and chromel 6. However, it is well known that any other two dissimilar metals can be used with more or less effectiveness.

Figure 4:
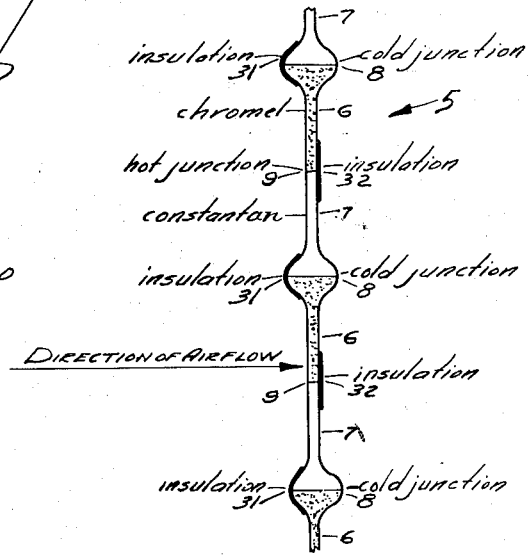
Fig. 4 is an enlarged view of the thermopile bar of Fig. 2.

Alternate cold junctions 8, Fig. 4, are made with enlarged cross-sectional areas so that they will have low resistance, thereby resulting in unappreciable heating when A. C. is passed therethrough. The hot junctions 9 are made of small cross-sectional areas so that they will have a high resistance, thereby resulting in a considerable heating when A. C. current is passed therethrough.

Figure 1:
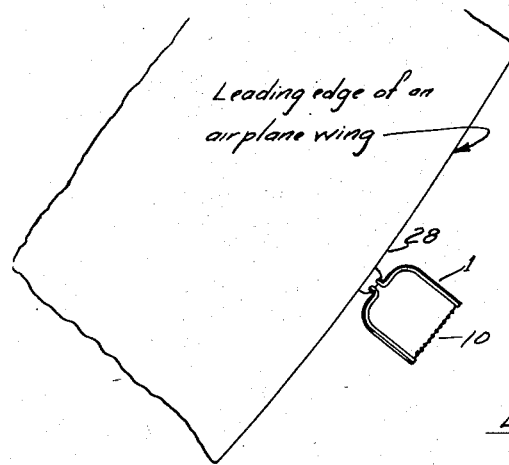
Fig. 1 is a plan view of the pick-up device mounted on the leading edge of an airplane wing.

This pick-up device is mounted preferably under the nose of the fuselage or on the leading edge of a wing 28, Fig. 1. It should preferably be located on the aeroplane so that its axis 10 is parallel to the longitudinal axis or thrust line of the aircraft, out of the slip stream and free from disturbances caused by the aircraft structure.

Figure 6:
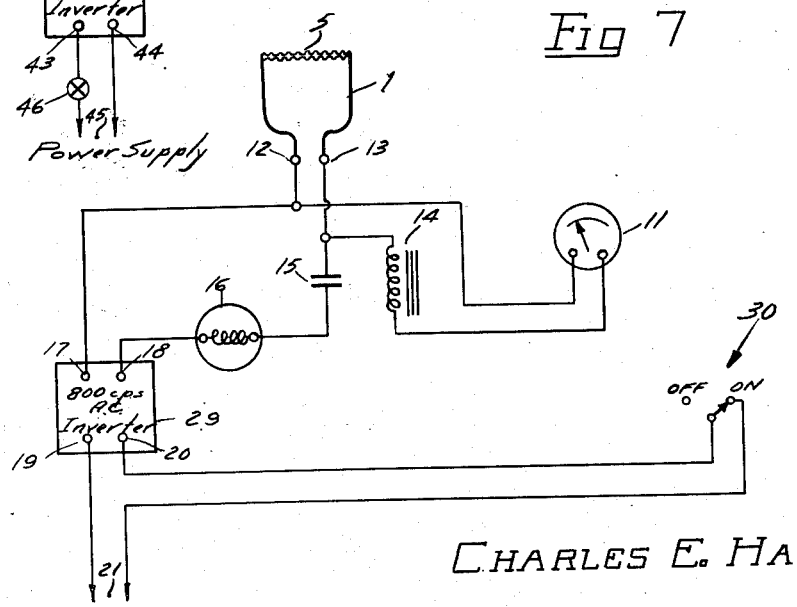
Fig. 6 is a wiring diagram of one form of the invention.

Fig. 6 shows a wiring diagram of one form of the invention, whereby the instrument is changed from a "heated" type instrument for measuring low velocities to an "adiabatic" type instrument for measuring high velocities. Throwing the switch from the "On" to the "Off" position removes the electrical supply of heat to the instrument. The instrument then operates on a different principal, the adiabatic temperature rise principle, and is practical only at the higher airspeeds. Thus, this instrument makes use of two phenomena, each in the range where the effects are most practical.

Figure 14:
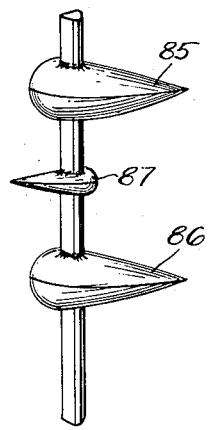
Fig. 14 shows a thermopile bar whose junctions have different aerodynamic shapes to affect a temperature differential therebetween due to different magnitudes of air friction and pressure distribution over said shapes in high speed airstreams.

In this arrangement, the pick-up device 1 has the forward side of each cold junction 8 coated with a heat insulating material 31, and the other alternate hot junctions 9 are heat insulated 32 on the rearward side. Different adiabatic temperature rises are indicated between the large 8 and small 9 junctions, as a result of different types of airflow. It is known that average adiabatic temperature rises of a sphere and a cylinder are different. The large thermal junctions 8 in the thermal bar 5 can be considered a sphere, and the small junctions 9 simulate a cylinder. However, to increase the output it is advisable to apply a coating of heat insulating material 31 to the front of cold junctions 8 and to apply heat insulating material 32 to the rear of the other hot junctions 9. This heat insulating material can be painted on as one practical method of application. The adiabatic temperature rise effect may also be increased by further changing the aerodynamic shape of alternate junctions as shown in Fig. 14. Different aerodynamic shapes affect a temperature differential between said junctions due to air friction and pressure distribution over said shapes in high speed airstreams. The junctions 85 and 86 may be cold junctions, and the junction 87 may be a hot junction.

A great many other applications of this instrument, such as measuring the direction of flow by adapting this type of instrument to the method described in the published British Reports and Memoranda No. 1019 are possible.

The most outstanding advantages of this instrument which are really important are that radiation effects tend to cancel, ambient temperature changes are negligible, and the measurement of the output is a direct measurement of a quantity rather than a measurement of a small change in the quantity.

A Mach number meter (ratio of the true velocity to the velocity of sound at the existing temperature) may also be made, based on this principle, by the selection of a thermocouple material with a nonlinear voltage temperature relation such that it would convert the true airspeed meter into a Mach number meter. Copper constantan, for example is non-linear, whereas Chromel constantan is reasonably linear. By combining non-linear couples in series with linear couples, practically any required temperature compensation may be obtained. Mach number depends only on the true velocity and the air temperature.

In Fig. 6, D. C. millivoltmeter 11 and choke coil 14 are electrically connected in series across the pick-up 1 output terminals 12 and 13. Capacitor 15, ballast tube 16 and the output terminals 17 and 18 of an A. C. inverter 29, the frequency of which I prefer to make 800 cycles per second, are also connected in series across the pick-up 1 output terminals 12 and 13. The input terminals 19 and 20 of said inverter 29 are connected across a 12-volt D. C. power supply 21. Between the power supply 21 and input terminal 20 is inserted a selector switch 30, being a single pole double throw switch, one pole being the "On" position and the other pole being the "Off" position.

In Fig. 6, when the instrument is to be operated for low velocities, as for helicopters, the electrically heated thermopile type principal should be applied. This is achieved by throwing selector switch 30 to the "On" position. D. C. power is thereby fed into the inverted 29 where it is converted into an 800 C. P. S. A. C. or any other desired frequency. Said A. C. output is fed into the pick-up unit 1 and its associated thermopile 5, through ballast tube 16 and capacitor 15. Said energizing A. C. heats up the thermopile bar. Because the junctions 8 are of enlarged cross-sectional area, thereby offering much less resistance than the smaller cross-sectional areas of junctions 9, said enlarged junctions 8 will heat up very much less than said smaller cross-sectional junctions 9. The enlarged junctions 8 are accordingly known as "cold" junctions; the smaller junctions 9 are known as "hot" junctions. As the velocity of air flow impinges against said hot and cold junctions, the temperatures thereof tend to equalize. In other words, all the thermopile junctions tend toward the same temperature throughout. By selecting thermocouple material with a non-linear voltage temperature relation, the device will indicate Mach numbers. Copper constantan, for example, is non-linear, whereas Chromel constantan is reasonably linear. By combining nonlinear thermocouples in series with linear couples, practically any required temperature compensation may be obtained.

When the air speed is low, the cooling effect of the passing air stream is small, and the generated E. M. F. of the thermopile will depend to a substantial extent on the temperature differential of adjacent junctions resulting from the $I^2 R$ effect of current passing through said junctions, $I^2$ denoting current squared, and R resistance. In this particular low speed case the potential indication will be large since the temperature differential will be large.

In this low speed range, when the air speed is higher, the cooling effect of the air stream is large, then the hot junctions will be considerably cooled, thereby resulting in a small temperature differential between adjacent junctions, and a small generated E. M. F. In this case the potential indication will be small.

Since thermocouple voltage is a function of the thermocouple temperature differential, and since the thermocouple temperature differential is a function of airspeed, then the thermocouple voltage is a function of airspeed. In the present invention a plurality of thermocouples are connected in series in the form of a summation of their individual potentials. Said total thermopile voltage is impressed across millivoltmeter 11 that responds to said voltage, and is calibrated to indicate the corresponding airspeed.

Capacitor 15 prevents the thermopile current from being affected by the power supply. It blocks any D. C. components, but bypasses the A. C. components. Choke 14 prevents the A. C. power from heating the D. C. measuring instrument 11. It suppresses any A. C. components, but bypasses the thermopile D. C. Ballast tube 16 insures a constant current in the circuit of an R. M. S. value.

In this particular low speed operating range, the presence of insulating material on the front and back of alternate junctions does not materially affect the operation of the thermopile. However, in the high speed application, about to be described, said insulating coating materially augments the output of the thermopile. Nevertheless, the instrument will function without said insulation coating. It greatly increases the thermopile output in the high velocity range and has no appreciable affect in the low velocity range.

In Fig. 6, when the instrument is to be operated for high velocity and true airspeeds, as for airplanes, the adiabatic temperature rise principle must be applied. This is accomplished by throwing switch 30 to its "Off" position. This removes the electrical power supply of heat to the thermopile. The thermopile now depends on its heat from its adiabatic temperature rise. When a body is placed in a high velocity air stream, the air which comes to rest in front of the body, the stagnation region, is compressed and its temperature is raised depending only on the true velocity of the air. This temperature rise is 25° C. at 500 miles per hour and is independent of the air temperature or air density. The sides and back of the object placed in the air stream have lower temperatures than this full adiabatic value. As a result, a heat induction body assumes some average temperature depending on the temperature in different areas and the rate of heat conductivity in those regions.

At low velocities these adiabatic temperature rise effects are negligible. The temperature rises which result from the compression of the air in front of the body, and due to the friction of air flowing around the body, varies as the square of the velocity and are less than ¼° C. at 50 miles per hour.

When the switch 30 is thrown to the "Off" position, and the heating supply is consequently turned off, the instrument depends on its thermal difference electromotive force generated by the thermopile as the result of adiabatic temperature rise. Since the adiabatic temperature rise differs in the case of the junction 8, generally a sphere and the junction 9, generally a cylinder, the temperature differential provides the thermocouple potential. However, to increase the E. M. F. output, the coatings of heat insulating 31 and 32 are relied upon. Thus the total thermopile voltage is impressed across millivoltmeter 11, which responds to said voltage and is calibrated to indicate the corresponding true airspeed.

Figure 7:
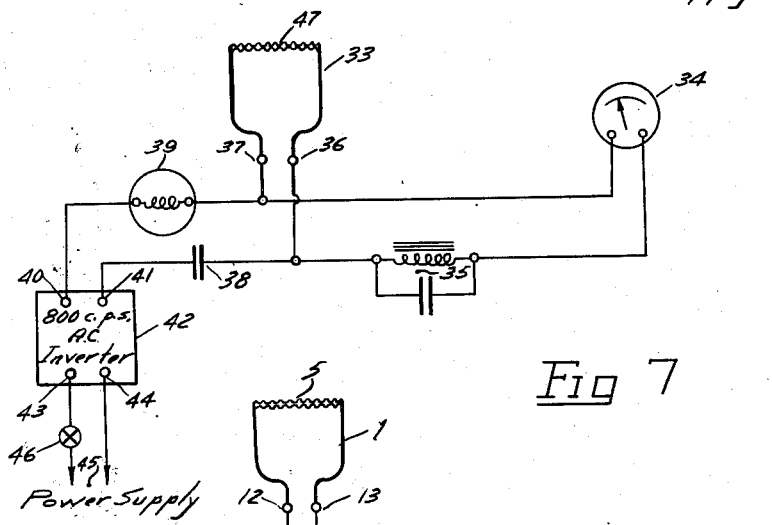
Fig. 7 is a modified wiring diagram of the invention.

Fig. 7 is a modification of Fig. 6. It represents the application of the electrically heated thermopile for low airspeeds only, such as of a helicopter. D. C. millivoltmeter 34 and parallel resonant circuit 35 are electrically connected in series across the pick-up output terminals 36 and 37. Parallel resonant circuit 35 is tuned to 800 C. P. S., in resonance with the output of inverter 42. Capacitor 38, ballast tube 39, and the output terminals 40 and 41 of 800 C. P. S. A. C. inverter 42 are also connected in series across the pick-up output terminals 36 and 37. The input terminals 43 and 44 of said inverter 42 are connected across 12 volt D. C. power supply 45, which is controlled by power line switch 46.

When the apparatus is to be operated, switch 46 is closed, thereby feeding D. C. current into the inverter 42. Said current is converted into an 800 C. P. S. A. C. Said A. C. output is fed into the pick-up unit 33 and its thermopile 47 through ballast tube 39 and capacitor 38. Said energizing A. C. heats up the thermopile 47 bar, and the apparatus utilizes the thermal difference electromotive force generated in thermopile 47 in the same manner as heretofore described for Fig. 6 for low speeds.

Capacitor 38 prevents thermopile current from being affected by the power supply. It blocks the D. C. components, and bypasses the A. C. components. Ballast tube 39 insures a constant current in the circuit of a R. M. S. value. Parallel resonant circuit 35 is tuned to resonate at 800 C. P. S., the particular frequency of the inverter 42 output. It prevents the A. C. power from heating the D. C. measuring instrument. The parallel tuned circuit offers a very high impedance to currents of its resonant frequency thereby suppressing them. The thermopile voltage is impressed across millivoltmeter 34 that responds to said voltage, and is calibrated to indicate the corresponding airspeed.

Figure 11:
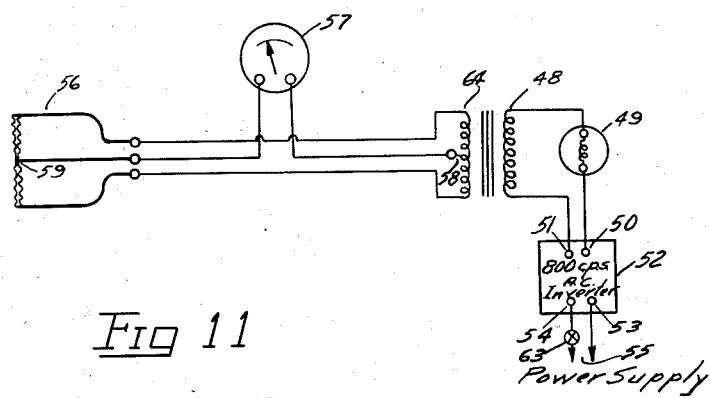
Fig. 11 is another modified wiring diagram of the invention.

A more practical method of supplying A. C. heating power to the electrically heated thermopile is shown in Fig. 11. This arrangement supplies A. C. power by means of a center tapped transformer and a center tapped thermopile. The primary difference between the device shown in Fig. 2 and the device shown in Fig. 8 lies in the fact that Fig. 8 is constructed and arranged to reverse the polarity at the center tap.

Primary coil 48 and ballast tube 49 are connected in series across the output terminals 50 and 51 of inverter 52. The input terminals 53 and 54 of said inverter 52 are connected across a 12-volt D. C. power supply 55 and controlled by switch 63. Pick-up unit 56 is connected across secondary coil 64. Direct current indicating instrument (millivoltmeter) 57 is connected across secondary coil center tap 58 and thermopile center tap 59.

Figure 10:
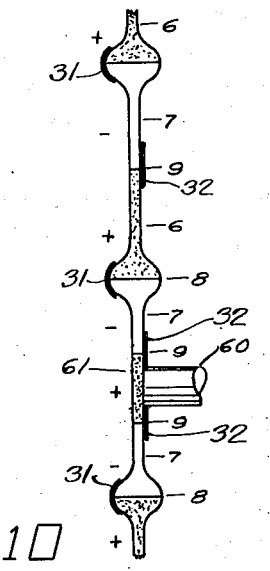
Fig. 10 is an enlarged view of a portion of the thermopile bar shown in Fig. 8, and its connection to the center prong of the pick-up structure.
Figures 8, 9:
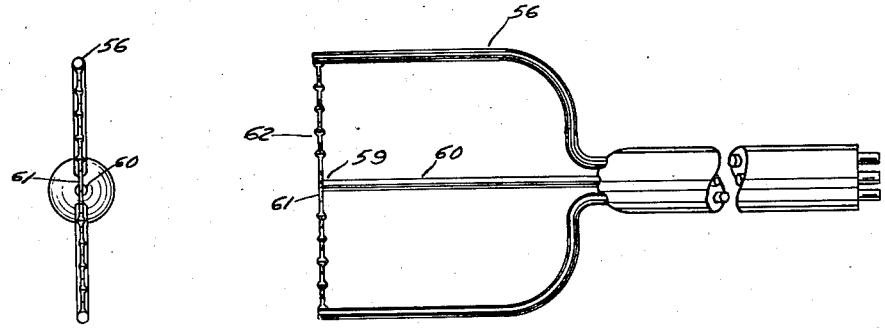
Fig. 8 is a plan view of a modified form of the pick-up showing the thermopile bar.
Fig. 9 is a front view of Fig. 8.

Pick-up unit 56 is similar to that heretofore described in Fig. 6 as numeral 1, except that it has an additional third prong 60 for center tapping which is welded to an additional metal element 61 inserted in the center of thermopile 62 as shown in Figs. 8, 9 and 10. This being an electrically heated thermopile arrangement, no insulating material is needed on the junctions.

Since the direct current meter 57 is connected between the center tap 58 of the power supply and the center tap 59 of the thermopile 62, the alternating current voltages will cancel since the center taps are at points of equipotential, and little or no alternating current will flow through the direct current meter 57.

However, the thermal voltages generated in the thermopile are such that the two sections of the thermopile are effectively in parallel supplying the direct-current meter. The direct-current voltage is directly proportional to the temperature difference between the hot junctions and the cold junctions if proper thermocouple materials are chosen. Chromel-Alumel, Chromel-constantan, or platinum-platinum-rhodium and many others would be useable. Chromel-constantan is shown in Fig. 11.

Figure 12:
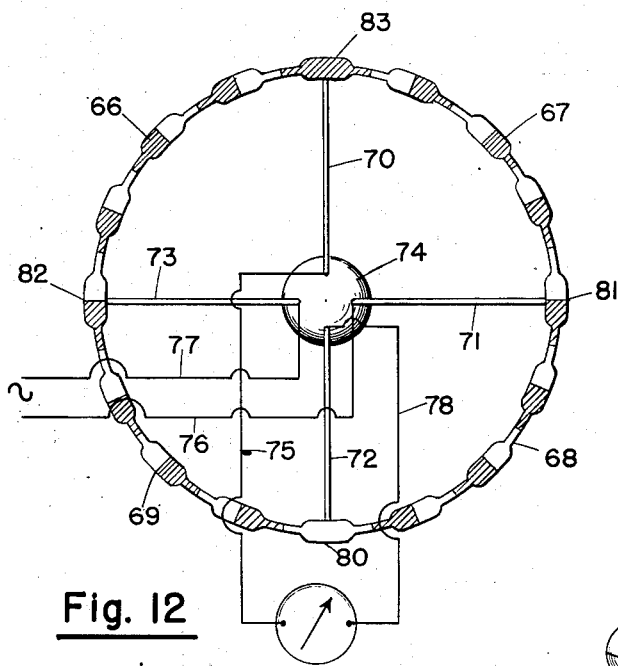
Fig. 12 is a plan view of the invention embodied in a Wheatstone bridge with the insulation omitted for the purpose of clarity.
Figure 13:
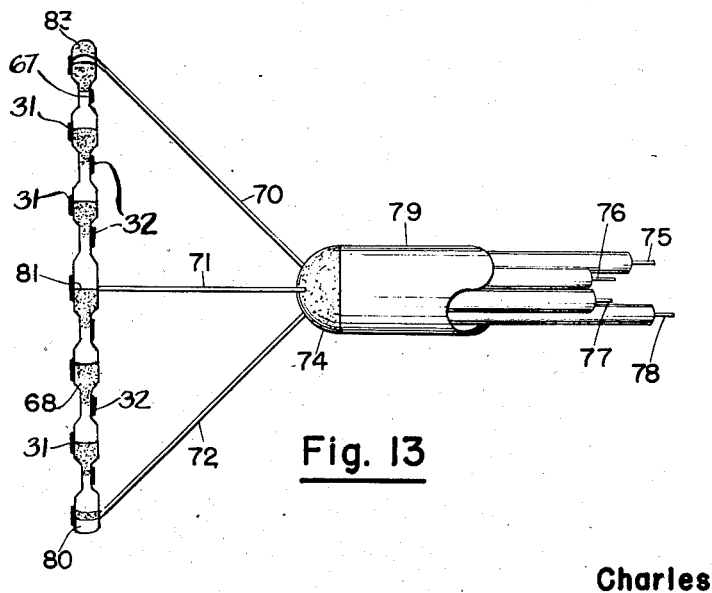
Fig. 13 is a side elevational view of Fig. 12.

Figs. 12 and 13 constitute a bridge arrangement embodying my invention. Reference numeral 65 indicates generally a circular thermopile divided quadrantly into bridge arms 66, 67, 68 and 69, by supporting conductors 70, 71, 72 and 73. Said conductors converge pyramidally into a receiving insulation plug 74 and connect with leads 75, 76, 77 and 78. A brass mounting sleeve 79 encompasses the conductors adjacent the plug to firmly bind and assemble the elements into a portable unit. The thermopile ring is arranged into a four-arm bridge so that the polarity of the thermopile voltages are additive with respect to corner 80 of the bridge. A controlled alternating current source is connected across corners 81 and 82 through leads 76, 77. A D. C. millivoltmeter is connected across corners 80 and 83 through leads 75, 78. In operation, this device functions as described for Figs. 6 and 7, i. e., as a "heated" type instrument for measuring low velocities or an "adiabatic" type for measuring high velocities.

The invention described herein may be manufactured and used by or for the Government of the United States of America for governmental purposes without the payment of any royalties thereon or therefor.

I claim:

1. In an airspeed indicator, comprising: a source of direct current; a selector switch to control said power source; an inverter to convert said direct current into alternating current; a thermopile connected across said inverter output terminals, having the cold junctions of substantially greater cross-sectional area than the associated hot junctions so that the difference of $I^2 R$ through said junctions generates an E. M. F. of measurable magnitude, where $I^2$ denotes current squared and R electrical resistance; means for supporting said thermopile in the airstream; heat insulation on the forward side of said cold junctions and on the rearward side of said hot junctions; a ballast tube in series with said thermopile and said inverter; a capacitor in series with said thermopile and said inverter; a galvanometer connected across said thermopile; and a choke coil in series with said galvanometer and said thermopile.

2. In an airspeed indicator, comprising: a source of direct current; switch means to control said current; means to convert said direct current to A. C.; a thermopile connected across said converting means, having the cold junctions of substantially greater cross-sectional area than the associated hot junctions so that the difference of $I^2 R$ through said junctions generates an E. M. F. of measurable magnitude, where $I^2$ denotes current squared and R, electrical resistance; means for supporting said thermopile in the airstream; heat insulating means on the forward side of said cold junctions and on the rearward side of said hot junctions; substantially constant current regulating means between said converting means and said thermopile means to block D. C. but pass A. C. between said converting means and said thermopile; a direct current indicating means connected across said thermopile; and means between said thermopile and said indicating means to block A. C. but pass D. C.

3. In an airspeed indicator, comprising: a source of alternating current; a thermopile connected across said source, having the cold junctions of substantially greater cross-sectional area than the associated hot junctions so that the difference of $I^2 R$ through said junctions generates an E. M. F. of measurable magnitude, where $I^2$ denotes current squared and R electrical resistance; means for supporting said thermopile in the airstream; heat insulating means on the forward side of said cold junctions and on the rearward side of said hot junctions; means to block D. C. but pass A. C. between said source and said thermopile; deflecting means responsive to the E. M. F. of said thermopile; and reactance means connected between said deflecting means and said thermopile.

4. In an airspeed indicator, comprising: a source of alternating current; a thermopile bar connected across said source, having the cold junctions of substantially greater cross-sectional area than the associated hot junctions so that the difference of $I^2 R$ through said junctions generates an E. M. F. of measurable magnitude, where $I^2$ denotes current squared and R electrical resistance; means for supporting the thermopile bar in the airstream; heat insulating means on the forward side of the cold junctions and on the rearward side of the hot junctions; means to block D. C. but pass A. C. between said source and said thermopile bar; means operatively connected to said thermopile bar and responsive to said E. M. F.; and means between said thermopile bar and said responsive means to block A. C. but pass D. C.

5. An airspeed indicator, comprising: a source of direct current; a switch to control said source; an inverter to convert said direct current into alternating current; a thermopile having the cold junctions of substantially greater cross-sectional area than the associated hot junctions so that the difference of $I^2 R$ through said junctions generate an E. M. F. of measurable magnitude where $I^2$ denotes current squared and R, electrical resistance, the polarity of said thermopile being reversed on opposite sides of its center; means for supporting the thermopile in the airstream; heat insulating material on the forward side of the cold junctions and on the rearward side of the hot junctions; a transformer having its primary coil connected across the output terminals of said inverter and its secondary coil connected across said thermopile; a D. C. millivoltmeter center-tapped across said secondary coil and said thermopile; and a ballast tube in series with said primary coil.

6. An airspeed indicator, comprising: a source of direct current; an inverter to convert said current; a thermopile having the cold junctions of substantially greater cross-sectional area than the associated hot junctions so that the difference of $I^2 R$ through said junctions generates an E. M. F. of measurable magnitude where $I^2$ denotes current squared and R, electrical resistance, the polarity of said thermopile being reversed on opposite sides of its center; means for supporting the thermopile in the airstream; heat insulating material on the forward side of the cold junctions and on the rearward side of the hot junctions; inductive coupling means coupling said inverter and said thermopile through a constant current means; and a galvanometer center-tapped across said coupling means and said thermopile.

7. In an airspeed indicator, comprising: a source of alternating current; a thermopile having its cold junctions of substantially greater cross-sectional area than the associated hot junctions, adapted to generate a thermal difference E. M. F., the polarity of said thermopile being reversed on opposite sides of its center; means for mounting the thermopile in the airstream; heat insulating material on the forward side of the cold junctions and on the rearward side of the hot junctions; inductive coupling means coupling said source of current and said thermopile; and deflecting means responsive to said E. M. F. center-tapped across said inductive coupling means and said thermopile.

8. In an airspeed indicator, comprising: a source of alternating current; thermocouple means having its cold junction means of substantially greater cross-sectional area than the associated hot junction means, adapted to generate a thermal difference of E. M. F., the polarity of said thermocouple means being reversed on opposite sides of its center; means for mounting the thermocouple means in the airstream; heat insulating material on the forward side of the cold junction means and on the rearward side of the hot junction means; inductive coupling means coupling said source of current and said thermocouple means; and means responsive to said E. M. F. center-tapped across said inductive coupling means and said thermocouple means.

9. In an airspeed indicator, comprising: a source of alternating current; thermocouple means having its cold junction means of substantially greater cross-sectional area than the associated hot junction means, the polarity of said thermocouple means being reversed on opposite sides of its center; means for mounting said thermocouple means in the airstream; heat insulating material on the forward side of the cold junction means and on the rearward side of the hot junction means; inductive coupling means coupling said source of current and said thermocouple means; and a galvanometer center-tapped across said inductive coupling means and said thermocouple means, said galvanometer being calibrated in airspeed.

10. In an airspeed pick-up apparatus: a thermopile bar having cold junctions of substantially greater cross-sectional area than the associated hot junctions, said thermopile bar being adapted to be mounted in the airstream; and heat insulation carried on the forward side of said cold junctions and carried on the rearward side of said hot junctions.

11. In an airspeed meter, comprising: a thermopile having the cold junctions of substantially greater cross-sectional area than the associated hot junctions and arranged in a four arm bridge such that the polarity of the thermopile voltages are additive with respect to one corner of said bridge; means mounting said thermopile in the airstream; heat insulation means on the forward side of the cold junctions and on the rearward side of the hot junctions; an E. M. F. responsive means attached to said corner and opposite corner of said bridge; and a regulated alternating current source coupled to the other two opposite corners of the bridge from said E. M. F. responsive means.

12. An air speed indicator, comprising: a source of A. C. current; a thermopile having cold junctions of substantially greater cross-sectional area than the associated hot junctions; means mounting the thermopile in the airstream; heat insulating material on the forward side of the cold junctions and on the rearward side of the hot junctions; means connecting said thermopile to said source, said means comprising means to block D. C.; an electrical potential indicating device; and means connecting said indicating device to said thermopile, said last named means comprising means to block A. C.

13. An airspeed indicator, comprising: a thermopile having cold junctions of substantially greater cross-sectional area than the associated hot junctions; means for supporting said thermopile in the airstream; heat insulating means on the forward side of the cold junctions and on the rearward side of the hot junctions; and electrical potential indicating means connected to said thermopile and responsive to changes in the potential generated by the thermopile resulting from changes in the wind velocity on the thermopile.

14. An airspeed indicator comprising a thermopile having cold junctions of substantially greater cross-sectional area than the associated hot junctions; means for supporting said thermopile in the airstream; insulating means on the forward side of the cold junctions and on the rearward side of the hot junctions; A.-C. electrical means operatively connected to said thermopile for heating the same; and electrical potential indicating means operatively connected to said thermopile and responsive to changes in the D.-C. potential generated in said thermopile resulting from changes in the wind velocity on the thermopile.

15. The indicator described in claim 13 wherein the thermopile is additionally characterized as constructed of metals with a predetermined non-linear voltage-temperature relation, and the indicating means is calibrated in terms of Mach numbers.

CHARLES E. HASTINGS.

REFERENCES CITED

The following references are of record in the file of this patent:

UNITED STATES PATENTS

| Number | Name | Date |
|---|---|---|
| 521,168 | Jungner | June 12, 1894 |
| 1,264,423 | Moore | Apr. 30, 1918 |
| 1,638,894 | Todd | Aug. 16, 1927 |
| 1,766,148 | Sawyer | June 24, 1930 |
| 1,827,252 | Mollard | Oct. 13, 1931 |
| 1,987,642 | Schueler | Jan. 15, 1935 |
| 1,996,943 | Wile | Apr. 9, 1935 |
| 2,193,516 | Laing | Mar. 12, 1940 |
| 2,314,877 | Hall | Mar. 30, 1943 |
| 2,340,899 | Ray | Feb. 8, 1944 |
| 2,434,433 | Ray | Jan. 18, 1948 |

FOREIGN PATENTS

| Number | Country | Date |
|---|---|---|
| 888,695 | France | Sept. 13, 1943 |
| 115,729 | Great Britain | May 23, 1918 |

OTHER REFERENCES

A publication entitled Vacuum Thermocouples for Measuring Weak Alternating Currents, describing apparatus of P. J. Kipp and Zonen, on page 472 of Instruments, August 1931. (A copy is in the Scientific Library of the U. S. Patent Office and a photostat is in Div. 36, 73-204.)

Blackie, A., J. Sc. Insts., vol 18, (1941), pp. 113-4.

Hawthorne, J. Inst. Fuel, vol. 12, March 1939, p. S 67. (Copy in Sc. Libe.)